US010733235B2

(12) United States Patent
Henery

(10) Patent No.: US 10,733,235 B2
(45) Date of Patent: Aug. 4, 2020

(54) AID FOR DYSLEXIC READERS

(71) Applicant: Patricia Henery, San Francisco, CA (US)

(72) Inventor: Patricia Henery, San Francisco, CA (US)

( * ) Notice: Subject to any disclaimer, the term of this patent is extended or adjusted under 35 U.S.C. 154(b) by 465 days.

(21) Appl. No.: 14/734,330

(22) Filed: Jun. 9, 2015

(65) Prior Publication Data

US 2015/0286621 A1 Oct. 8, 2015

(51) Int. Cl.
*G06F 17/00* (2019.01)
*G06F 16/903* (2019.01)
*G06F 40/109* (2020.01)

(52) U.S. Cl.
CPC .......... *G06F 16/903* (2019.01); *G06F 40/109* (2020.01)

(58) Field of Classification Search
CPC ............................... G06F 17/24; H04M 3/493
USPC .................................................. 715/256, 200
See application file for complete search history.

(56) References Cited

U.S. PATENT DOCUMENTS

| | | | | |
|---|---|---|---|---|
| 4,582,441 A * | 4/1986 | Carter | ....................... | G06F 3/16 400/63 |
| 5,875,429 A * | 2/1999 | Douglas | .................. | G10L 15/26 704/235 |
| 6,212,497 B1 * | 4/2001 | Araki | ...................... | G10L 15/26 382/229 |
| 6,324,511 B1 * | 11/2001 | Kiraly | .................. | G09B 21/006 704/260 |
| 7,328,409 B2 * | 2/2008 | Awada | .................. | G06F 9/4443 715/762 |
| 7,451,398 B1 * | 11/2008 | Rohrs | ................... | G06F 17/273 715/255 |
| 7,461,351 B2 * | 12/2008 | Bailey | ................... | G06F 17/211 345/467 |
| 8,306,356 B1 * | 11/2012 | Bever | ..................... | G06K 9/723 382/275 |
| 8,315,879 B2 * | 11/2012 | Allen, Jr. | ............... | G06F 17/241 704/231 |
| 8,464,149 B2 * | 6/2013 | Griffin | .................. | G06F 1/1626 715/256 |
| 8,886,518 B1 * | 11/2014 | Wang | ................... | G06F 17/2818 704/1 |
| 9,128,994 B2 * | 9/2015 | Smolinski | ......... | G06F 17/30554 |

(Continued)

OTHER PUBLICATIONS

Nuance, naturallyspeaking—Documentation, May 11, 2015 (wayback), Nuance, pp. 1-2.*

(Continued)

*Primary Examiner* — Manglesh M Patel
(74) *Attorney, Agent, or Firm* — Young Basile Hanlon & MacFarlane, P.C.

(57) ABSTRACT

Text for display on a user device may be modified or adjusted by a number of text adjustment settings to make the displayed text easier to decode for the reader. The text adjustment settings are presented to the user in such a way that the user does not need to decode characters on a display screen of the user device in order to make a decision as to which of the text adjustment settings to select. For example, the choices may be conveyed using verbal cues from the speaker of the user device and/or by the use of color and/or shapes on the display screen. Once one or more text adjustment settings are selected, they may be stored as a default setting for the user requests the display of text.

21 Claims, 4 Drawing Sheets

(56) References Cited

U.S. PATENT DOCUMENTS

| | | | |
|---|---|---|---|
| 2002/0099744 A1* | 7/2002 | Coden | G06F 17/273 715/267 |
| 2002/0152255 A1* | 10/2002 | Smith, Jr. | G06F 9/4443 718/102 |
| 2003/0117365 A1* | 6/2003 | Shteyn | G06F 3/0481 345/156 |
| 2004/0122941 A1* | 6/2004 | Creamer | H04M 3/42059 709/224 |
| 2004/0205579 A1* | 10/2004 | Brassell | G06F 17/2229 715/205 |
| 2004/0205642 A1* | 10/2004 | Menninga | G06F 17/211 715/244 |
| 2005/0228642 A1* | 10/2005 | Mau | G06F 17/273 704/9 |
| 2007/0061132 A1* | 3/2007 | Bodin | G10L 15/193 704/200 |
| 2007/0198945 A1* | 8/2007 | Sun | G09B 21/006 715/779 |
| 2008/0222518 A1 | 9/2008 | Walker | |
| 2008/0260210 A1* | 10/2008 | Kobeli | G09B 21/006 382/114 |
| 2013/0030815 A1* | 1/2013 | Madhvanath | G06F 3/038 704/275 |
| 2015/0220503 A1* | 8/2015 | Landau | G06F 40/103 715/256 |
| 2015/0279367 A1* | 10/2015 | Hrabak | G10L 15/30 704/246 |
| 2015/0279371 A1* | 10/2015 | Fujioka | G09B 5/065 704/275 |
| 2017/0293598 A1* | 10/2017 | Abu-Huwaij | G06F 40/166 |

OTHER PUBLICATIONS

TextHelp, Read & Write Gold Beginners Guide, published May 2013, textHelp, Version 11, pp. 1-41 (pdf).*

Spector Lincoln, Automatic Capitalization, published Feb. 25, 2011, PCWorld, pp. 1-2 (pdf).*

* cited by examiner

AID FOR DYSLEXIC READERS

FIELD OF THE DISCLOSURE

This disclosure relates in general to adjusting text to aid dyslexic readers.

BACKGROUND

Dyslexia may be defined as a learning disability that makes reading, writing and spelling difficult. It has been identified as a neurological condition and is often inherited. Reading difficulties of individuals with dyslexia are widely attributed to phonological processing problems. Thus, teaching strategies for a dyslexic reader center around addressing these problems. For example, a dyslexic reader of the English language will practice the identification of individual sounds of the language and their association with a grapheme. Then, the sounds are blended into words.

SUMMARY

Researchers believe that causes of reading difficulties in dyslexic readers, other than phonological processing problems, exist. Studies do not conclusively support that a visual processing deficit contributes to the reading difficulties. However, reading text depends on a visual component. Many dyslexic readers easily understand spoken information. Thus, listening to text and/or listening to text in conjunction with reading the text can aid such readers. However, this aid is not always available and, when available, cannot always be used in the location where the reader is trying to read.

In contrast, the teachings herein adjust the text itself. The changes aid the dyslexic reader in decoding or processing text. In this way, reading fluency and reading comprehension may be improved.

One method described herein includes conveying a plurality of text adjustment settings such that each of the plurality of text adjustment settings is distinguished from others of the plurality of text adjustment settings on a basis other than characters presented on a display screen, receiving a selection from a user of at least one text adjustment setting of the plurality of text adjustment settings, presenting text modified using the at least one text adjustment setting, and storing the selection of the at least one text adjustment setting as a default setting for use next time a user makes a request to display text (also called written material).

Another method described herein includes receiving a request for display of written material, retrieving at least one text adjustment setting responsive to the request, the at least one text adjustment setting stored as a default setting within a non-transitory storage medium and the at least one text adjustment setting belonging to a plurality of available text adjustment settings, modifying the written material using the at least one text adjustment setting of the default setting, presenting the written material modified using the at least one text adjustment setting of the default setting, conveying a query to the user regarding whether to further modify the written material based on an available text adjustment setting of the plurality of available test adjustment settings, wherein the query includes an instruction for the user to provide a response to the query, the instruction relying on other than characters presented on the display screen to distinguish between possible responses to the query, and further modifying the written material when the response to the query indicates to further modify the written material.

An apparatus described herein includes a memory and a processor. The processor is configured to execute instructions stored in the memory to convey a plurality of text adjustment settings such that each of the plurality of text adjustment settings is distinguished from others of the plurality of text adjustment settings on a basis other than characters presented on a display screen, receive a selection from a user of at least one text adjustment setting of the plurality of text adjustment settings, present text modified using the at least one text adjustment setting on the display screen, and store the selection of the at least one text adjustment setting as a default setting in a storage device. The storage device may be the memory. The display screen is a part of a user device. In some implementations, the memory and the processor are remote from the user device.

Details of these embodiments, modifications of these embodiments and additional embodiments are described below.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
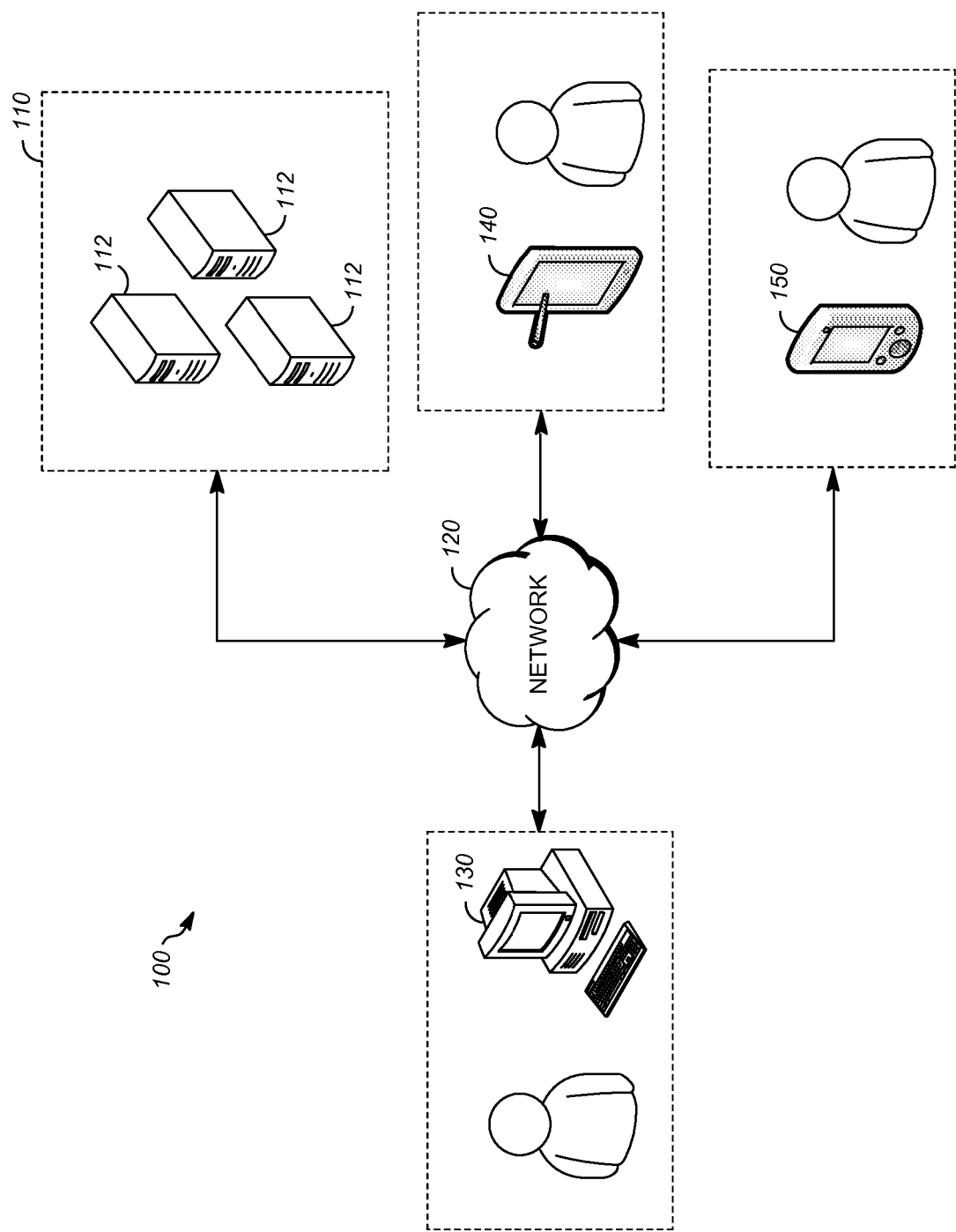
FIG. 1 is a block diagram showing an example of a network environment that in which embodiments of the present invention may be incorporated.

FIG. 1 is a block diagram that shows an example of a computing system 100 in which implementations of this disclosure may be incorporated. Computing system 100 may include a remote server (or computing) system 110 having one or more server computers 112 coupled through a network 120 to one or more user devices that are associated a user, such as user devices 130, 140, 150.

As part of remote server system 110, any configuration of server computers 112 can be utilized. For example, certain of the operations described herein may be performed by server computers 112 in the form of multiple groups of server computers that are at different geographic locations and may or may not communicate with one another, such as by way of network 120. In some implementations of computing system 100 described herein, remote server system 110 is omitted.

Network 150 can be one or more communications networks of any suitable type in any combination, including wireless networks, wired networks, local area networks, wide area networks, cellular data networks and the Internet. Remote computing system 110 and user devices 130, 140, 150 can all communicate with each other via network 120. In the implementations described herein, User devices 130, 140, 150 all communicate with remove computing system 110. It should be understood, however, that the teachings herein may be implemented in manners that contemplate direct communication between any or all of user devices 130, 140, 150 via network 120.

The example of FIG. 1 shows the user devices of computing system 100 as a desktop computer 130, a tablet computer 140 and a smartphone 150. Other types of user devices may also be part of computing system 100 as long as the user device has the ability to reproduce stored text and other visual data to a user on a screen. For example, a watch, glasses or other computing device, wearable or otherwise, that can display information in the user's field of vision may be a user device. Another example of a user device is a laptop computer. While three user devices are shown, fewer or more user devices may be part of computing system 100.

As explained in more detail hereinafter, computing system 100 is configured to retrieve text, adjust the text and present the adjusted text to a user on one or more user devices, such as user devices 130, 140, 150. Computing system 100 is also configured to generate and store the settings used to adjust the text. These functions may be performed in the context of an application that is used at a user device 130, 140 or 150 and is developed, published by, or otherwise attributable to a developer such as one associated with remote server system 110. Use of the application at a user device can include any or all of outputting information for display at the user device, receiving user input via an input device at the user device and executing computer program instructions at the user device. In some implementations, however, the application can be utilized at the user device without executing program instructions at the user device, such as by executing program instructions for the application at a different computing device (e.g., server computer 112).

Figure 2:
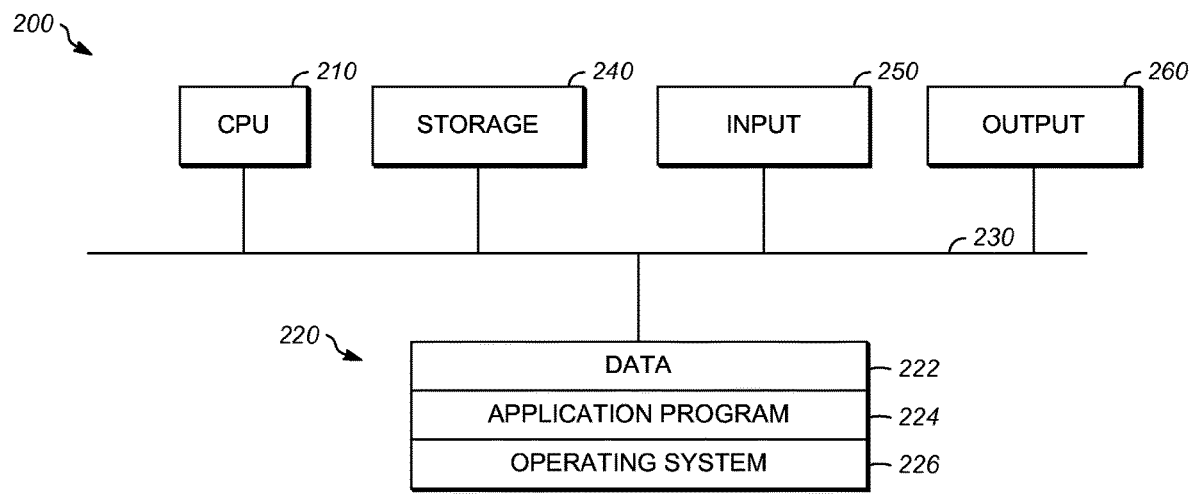
FIG. 2 is a block diagram showing an example of a hardware configuration for a computing device that may be used to implement the teachings herein.

FIG. 2 is a block diagram of an example of a hardware configuration for a computing device 200 that can be used to implement any or all of user devices 130, 140, 150, for example. The same hardware configuration or a similar hardware configuration can be utilized to implement a server computer 112 of remote computing system 110 when remote computing system 110 is included in computing system 100. In some implementations of remote computing system 110, the hardware configuration of one or more of server computers 112 is simplified to be used as cloud storage devices such as by omitting a display for a user.

Computing device 200 can include a CPU 210. CPU 210 may comprise one or more central processing units. Alternatively, CPU 210 can be any other type of device, or multiple devices, capable of manipulating or processing information now-existing or hereafter developed. Although the examples herein can be practiced with a single processor as shown, e.g. CPU 210, advantages in speed and efficiency may be achieved using more than one processor.

Computing device 200 can include a memory 220, such as a random access memory device (RAM). Any other suitable type of non-transitory storage device can be used as memory 220. Memory 220 can include code and data 222 that can be accessed by CPU 210 using a bus 230. Memory 220 can further include one or more application programs 224 and an operating system 226. Application program 224 can include software components in the form of computer executable program instructions that cause CPU 210 to perform some or all of the operations and methods described herein.

A storage device 240 can be optionally provided in the form of any suitable non-transitory computer readable medium, such as a hard disc drive, a memory device, a flash drive or an optical drive. One or more input devices 250, such as a keyboard, a mouse, a microphone or a gesture-sensitive input device, receive user inputs and can output signals or data indicative of the user inputs to CPU 210. One or more output devices 260 can be provided. One output device 260 may be a display device, such as liquid crystal display (LCD) or a cathode-ray tube (CRT), which allows output to be presented to a user, for example, in response to receiving a request for text. Another output device 260 may be a speaker that prompts input from a user as described herein.

Although FIG. 2 depicts CPU 210 and memory 220 as being integrated into a single unit, other configurations can be utilized. The operations of CPU 210 can be distributed across multiple machines (each machine having one or more of processors) that can be coupled directly or across a local area or other network. Memory 220 can be distributed across multiple machines or devices such as network-based memory or memory in multiple machines performing operations that may be described herein as being performed using a single computer or computing device for ease of explanation. Although a single bus 230 is depicted, multiple buses can be utilized. Further, storage device 240 can be a component of each of computing device 200 or can be a shared device that is accessed via a network. Computing device 200 thus be implemented in a wide variety of configurations.

Figure 3:
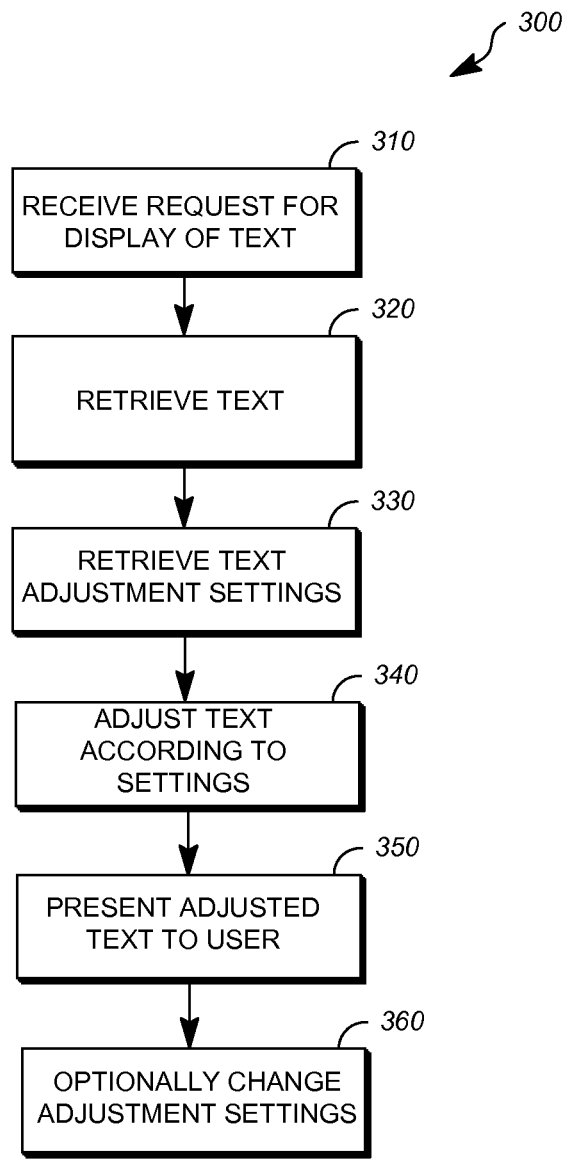
FIG. 3 is a flow chart showing an example of a process for presenting adjusted text to a user according to the teachings herein.

FIG. 3 is a flow chart showing an example of a process 300 for presenting adjusted text to a user. The operations described in connection with process 300 can be performed at one or more computing devices 200, such as a server computer 112 of remote computing system 110 or user device 130, 140 or 150. When an operation is performed by one or more computers, it is completed when it is performed by one computer. The operations described in connection with process 300 can be embodied as a storage device in the form of a non-transitory computer readable storage medium including program instructions executable by one or more processors that, when executed, cause the one or more processors to perform the operations. For example, the operations described in connection with process 300 could be stored at memory 220 of computing device 200 and be executable by CPU 210 of computing device 200.

At operation 310, a request is received for the display of text. The request can be received from user input. For example, the request can be an input into one or more input devices 250 that calls up a webpage on a web browser or a request to open an e-book. Any request for the display of text is possible. The request may be received and not transmitted to a remote source, such as server computer 112, or it may be received at a remote source, such as server computer 112, from a user device after receipt of the request at the user device. The request for the display of text may be made through one application, such as a web browser, etc., that triggers a separate application according to the teachings herein. The terms "operation" and "step" may be used interchangeably herein.

At operation 320, the text is retrieved responsive to the request. The text may be stored in any non-tangible storage medium. The text may be retrieved by receiving a stored file including the text transmitted over network 120, or may be retrieved from local memory such as storage device 240. The text may also be retrieved by receiving a copy of the contents (i.e., the text) of such a stored file.

Upon retrieval of the text at operation 320, processing advances to operation 330 to retrieve text adjustment settings. Text adjustment settings are described in additional detail with reference to FIG. 4.

Text is adjusted according to the adjustment settings at operation 340. That is, the appearance of text within a stored file may have existing settings. The existing settings may also be based on default settings of a display device and/or an application through which the text is requested. The existing settings may include formatting options such as font, color, size, etc. The existing settings may also include layout options such as number of words per line, paragraph spacing, etc. The standard settings also include conventions for presenting text in a language such as English. For example, one convention arranges the text for reading from left to right and top to bottom (in English). Another convention provides which words and letters within a word are capitalized and which words are not capitalized. These and other conventions are generally assumed to be inviolate. Although the phrase "adjustment settings" is used herein, only one adjustment setting may be performed at operation 340. Each adjustment setting may be associated with a desired appearance of the text. If the text already conforms to one or more of those settings, there is no need to adjust the text in the particular way indicated by any particular adjustment setting.

After the text is adjusted at operation 340, the text is presented to the user at operation 350. Presenting the adjusted text to the user involves reproducing the adjusted text on a display for viewing by the user. Upon presentation of the text, the adjustment settings may optionally be further adjusted as described with reference to FIG. 4. Note that the order of operations may vary. For example, the text may be presented to the user before the adjustment at step 340.

Figure 4:
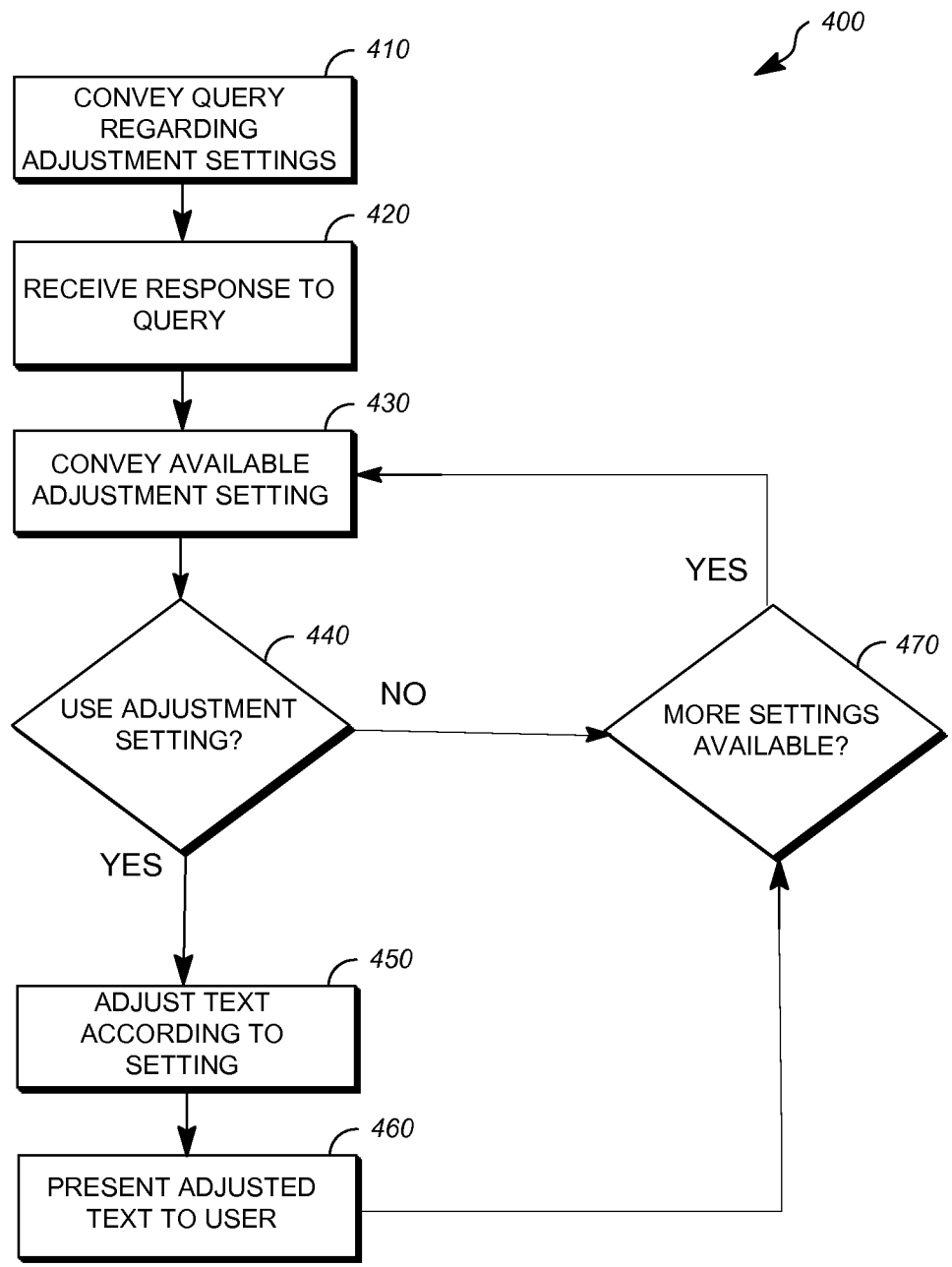
FIG. 4 is a flow chart showing an example of a process of setting or changing the text adjustments for the process of FIG. 3.

FIG. 4 is a flow chart showing an example of a process 400 of setting or changing the text adjustments for the process 300 of FIG. 3. More specifically, FIG. 4 shows how the text adjustment settings may be set at step 330 or changed at step 360. The operations described in connection with process 400 can be performed at one or more computing devices 200, such as a server computer 112 of remote computing system 110 or user device 130, 140 or 150. When an operation is performed by one or more computers, it is completed when it is performed by one computer. The operations described in connection with process 400 can be embodied as a storage device in the form of a non-transitory computer readable storage medium including program instructions executable by one or more processors that, when executed, cause the one or more processors to perform the operations. For example, the operations described in connection with process 400 could be stored at memory 220 of computing device 200 and be executable by CPU 210 of computing device 200.

At operation 410, a query regarding adjustment settings is conveyed to the user. The query can be conveyed responsive to, for example, the opening of a text adjustment application as described herein. The query may also be conveyed responsive to the presentation of text to user, either before it is adjusted or after it is adjusted and presented, at step 350 for example. Characters are the basic symbols used to write or print a language. For example, letters of the alphabet, numerals, punctuation marks and other symbols such as mathematical signs, the dollar sign, etc., are used as characters in the English language. Due to the processing difficulties of the dyslexic reader, it may be difficult to receive an accurate response from a user when the query is conveyed using only characters. That is, the user may not be able to select the desired response due to an error in processing a character-based prompt. Conveying the query thus desirably includes generating one or more visual or auditory prompts that are desirably non-character-based prompts or are otherwise recognizable or distinguishable (e.g., from each other when there is more than one) on a basis other than characters.

According to some implementations, the query may be generated as the desired responses using color and/or shapes on a display as the output 260 of a user device such as one of user devices 130, 140, 150. For example, buttons may be generated on a touch-sensitive display, such as a green button and a red button. In another example, the buttons may have different shapes, such as a round shape for one and an octagonal shape for another. As long as there is at least one non-character-based property identifying the prompt, in this case at least one non-character-based difference between the prompts, characters may also be generated in conjunction with each of the buttons. For example, the green and/or round button may include characters forming the word "YES" while the red and/or octagonal button may include characters forming the word "NO".

The query may be or include a vocal query from, for example, a speaker as the output 260 of a user device such as one of user devices 130, 140, 150. The vocal query may be a short phrase, optionally with instructions for how to respond. For example, the vocal query may be, "Change settings?" or "Change settings? Select green for yes and red for no." or "Change settings? Say yes or no."

At step 420, a response is received to the query. The response may be received at the input 250 of a user device such as one of user devices 130, 140, 150. For example, the response may be user contact with a button generated on a touch-sensitive display as the input 250. The response may also be a verbal response uttered by the user and picked up by a microphone as the input 250. If the response indicates that changes are not to be made, process 400 ends. Otherwise, process 400 advances to change the settings starting at operation 430.

At operation 430, an available adjustment setting is conveyed to the user. In some implementations described in more detail below, multiple available adjustment settings may be simultaneously conveyed to the user. The available adjustment setting may be conveyed as described previously with respect to operation 410. That is, an adjustment setting may be conveyed through the use of one or more buttons or other display icons on a display that can be uniquely identified with at least one non-character-based identifier. Additionally or alternatively, an adjustment setting may be conveyed in a vocal communication through a speaker. A vocal communication is also considered to provide a non-character-based identifier.

The adjustment setting may include a variety of possible settings to adjust text for the display. One adjustment setting may be a font type. For example, the font type may be OpenDyslexic, the free open source font developed specifically for dyslexic readers, or to another font designed for dyslexic readers such as Dyslexie. Another font type may be one or more selections of a standard sans-serif font.

The size of the font is another possible adjustment setting that can be incorporated into implementations of the present invention. For example, a larger font may make processing of text easier for a dyslexic reader. Thus, the adjustment setting could be a minimum font size in one implementation. In other implementations, the adjustment setting could be a number of font sizes above a minimum font size from which the user or dyslexic reader may select.

Font changes may include changes to some and not all of the characters forming the text. Generally, the settings are used to accent portions of the text in an effort to make that text easier to process. For example, some dyslexic readers have difficulty detecting the end of sentences and other punctuation. One way in which this may be addressed is to include settings for punctuation marks so that they are darkened and enlarged as compared to the words and other symbols within the text.

Another setting may change certain letters from lower case to upper case throughout the text. This could include changing some or all of the letters b, d, p, q, h, y, t, f, n, u, m, w and g. Another setting that may change the appearance of the text to add accents is color-coding vowels with a similar pronunciation. For example, a word or some portion of a word that forms a long "a" sound, together with one or more final consonants where applicable, may be colored red. In this implementation, word or word portions a, ay, ey, ai, eight, ake, ate, ame, ane, etc., may be in red font. Representations of a different vowel sound may be represented by a different font color. In this way, for example, a reader may more easily distinguish between the word "eight" and the word "height," which use similar letters but represent different vowel sounds.

Other options for the adjustment settings may delineate the accented syllable in a multi-syllabic word, such as by using a different color, line strength, etc, than the remainder of the word. This setting may be implemented alone or in conjunction with hyphenating the multi-syllabic words. In some cases, it may be desirable to hyphenate a multi-syllabic word differently than the standard hyphenation. For this latter adjustment setting, the hyphenation may be based in part on the Slingerland Approach to teaching reading. For example, the word timed is conventionally hyphenated as "tim-ed". In a setting where non-standard hyphenation is used, the hyphenation of timed may be displayed as "time-d".

The appearance of the text may be changed in other ways by the adjustment settings other than by changing the appearance of the font itself. These settings may control the overall appearance of the text on a display page. For example, a possible adjustment setting could include settings for the kern size, i.e., the size of the space between letters, or settings for the size of the space between the lines of text. The spacing between words on a line may also form one or more adjustment settings. Further, the number of words per line could be limited to, for example, no more than three words per line. In one implementation, the text may be converted to columns of single words that are, e.g., read from top to bottom. Some or all of the text may be written backward.

The adjustment settings may also include one or more settings for the color of the background and/or the font. The settings may be selected so as to improve the visibility of the text vis-à-vis the background. This is not necessarily an increase in contrast—it may represent merely a change in contrast. For example, a setting for the background color may be off-white and/or a setting for the text may be gray.

As mentioned above, operation 430 involves conveying an available adjustment setting to the user. Responsive thereto, the user may indicate in one of several ways whether the conveyed adjustment setting should be used to adjust the text. For example, the user may provide a verbal response picked up by a microphone. In another example where the adjustment setting is conveyed by a display, user contact with the display may indicate whether or not to use the adjustment setting. The technique of conveying the possible adjustment setting at operation 430 may dictate how the response is made. Similarly to conveying the query at operation 410, conveying the possible adjustment setting at operation 430 may include instructions for how to respond depending on whether the adjustment setting should be used or not.

When the query of operation 440 indicates that the user would like the adjustment setting used, the text is adjusted according to the setting at operation 450. Then, the adjusted text is presented to the user at operation 460 similarly to the presenting described with respect to operation 350. Although not shown, an optional step may include a query as to whether the adjustment setting should be kept or not. That is, if the user determines that the adjusted text does not provide any benefit, the adjustment to the text associated with the particular adjustment setting may be rejected.

Regardless of whether the adjustment setting is kept or not, process 400 advances to operation 470 to determine whether there are more adjustment settings available. If so, process 400 returns to operation 430 to convey the next available adjustment setting. For any conveyed adjustment setting, the user may choose not to use the adjustment setting at operation 440. When an adjustment setting is not used at operation 440, process 400 advances to operation 470 to determine whether other adjustment settings are available without adjusting the text. After all adjustment settings are either accepted or rejected by the user, process 400 ends. Desirably, the one or more adjustment settings selected (i.e., those used or accepted at operation 440) are stored automatically as default settings for use next time a request for the display of text is made at operation 310. In some implementations, process 400 may convey a query to the user as to whether one or more adjustment settings should be stored in a similar manner as described above with reference to operation 410 and receive a response in a similar manner as described above with reference to operation 420.

Process 400 is a sequential series of operations that conveys each available adjustment setting separately and then displays text using the setting before advancing to the next available adjustment setting. The particular way in which queries and available adjustment settings is not so limited as long as a query and/or the available adjustment settings are conveyed or presented in a way that distinguishes them to the user in some way other than characters. In other words, the dyslexic reader should be able to identify his or her selection without having to process characters, such as within any text that may be used to convey the queries and/or settings in some implementations. Further, process 400 does not have to be a sequential process as described in this example. Available adjustment settings may be conveyed and/or applied concurrently at least in part. One example of how process 400 may be implemented with such modifications is described with reference to FIGS. 5A and 5B.

Figure 5A:
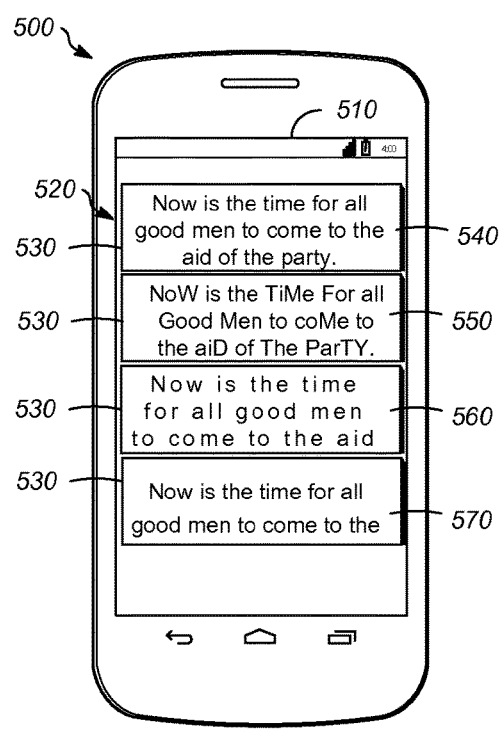
FIG. 5A is an illustration showing a user interface for displaying text before adjustments are applied.

FIG. 5A is an illustration showing one example of a user device 500 having a display screen 510 where a user interface 520 for a first example application is output for display at display screen 510. Although the description herein is not limited in its applicability to a particular type of layout, user interface 520 in the illustrated example uses a table view layout. Other layouts can be utilized, such as a grid view layout. User interface 520 can be utilized in the context of any type of application to deliver any type of information in text form. In this case, user interface 520 is used to concurrently convey a plurality of available adjustment settings through a plurality of user interface elements 530.

In some implementations, user interface elements 530 are static user interface elements that display content only. In other implementations, user interface elements 530 are active user interface elements that are activated in response to a user input (e.g. clicking or tapping the interface element). In the implementation shown, each of user interface elements 530 conveys a separate adjustment setting. For example, and responsive to an instruction from a user to set or revise the adjustment settings, the user interface elements 530 may be used to convey a sample text 540, sample text 540 modified by a first adjustment setting 550, sample text 540 modified by a second adjustment setting 560 and sample text 540 modified by a third adjustment setting 570. First adjustment setting 550 adjusts sample text 540 by changing certain letters into capital letters. Second adjustment setting 560 adjusts sample text 540 by kerning—namely, the spacing between adjacent letters is increased by fifty percent versus what is shown in sample text 540. Third adjustment setting 570 adjusts sample text 540 by increasing the line spacing by fifty percent. Display screen 510 is a scrolling display, so more adjustment settings could be accessed by scrolling display screen 510. Each user interface element 530 may also be scrolling or expandable to see additional text.

As mentioned above, the available adjustment settings are conveyed so that they are distinguishable on a basis other than characters. Here, this is done by delineating each of the adjustment settings within a separate user interface element 530. The user interface elements 530 may also be distinguished by color, such as coloring each a separate color (e.g., either the background or border) and/or by displaying the text in each user interface element 530 in a separate color. The use of the user interface elements 530 to convey the available adjustment settings may be supplemented by conveying audible instructions for how to respond. In one example, verbal input from the user may be requested. In the example shown, the user can contact each of the user interface elements 530 that allows the user to more accurately process the sample text 540. One contact by the user to a user interface element 530 can select an associated adjustment setting while another contact by the user can de-select the adjustment setting.

In still other implementations, user interface elements 530 can include both static user interface elements and active user interface elements. For example, samples of text similar to that in user interface elements 530 of FIG. 5A may be presented together with one or more buttons that can be used to select and/or de-select the adjustment setting associated with each sample. The button or buttons may be non-character-based prompts such as red and green buttons or buttons having different shapes so that they are distinguishable on a basis other than characters that may or may not be included on the display screen 510.

In still other implementations, user interface elements 530 can be GUI controls or GUI widgets.

Figure 5B:
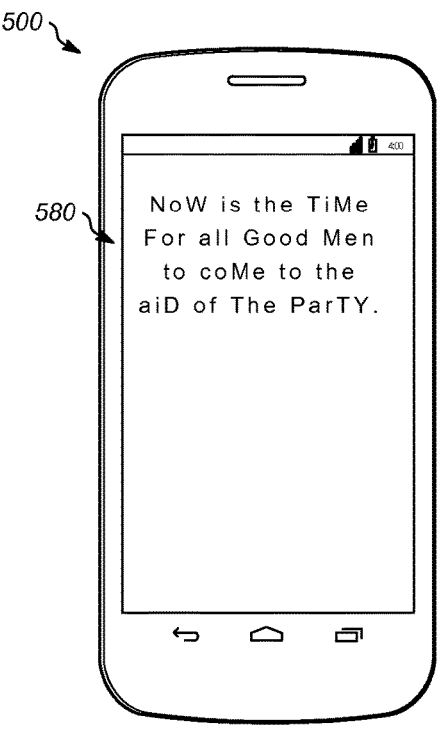
FIG. 5B is an illustration showing a user interface for displaying text after adjustments are applied.

Regardless of the technique used to convey and select the available adjustment settings, sample text 540 may be adjusted as described in operation 450 and presented to the user as described in operation 460 as part of process 400. In FIG. 5B, display screen 510 presents adjusted text 580 that is sample text 540 adjusted using adjustment settings 550, 560, 570 conveyed in FIG. 5A. Thereafter, the user may be given the option of keeping some or all of the settings and/or saving the selected one or more adjustment settings for use next time text is to be presented to a dyslexic reader in accordance with, for example, FIG. 3.

The foregoing description provides a wide range of options that can be changed individually or in groups to tailor published text on any number of user devices to the user's particular visual processing needs. The options, also called adjustment settings herein, can be saved as default settings in association with the user or user device so they can be used to modify text the next time the user makes a request for text. One or more settings could be changed after application to text. An interface with the user can convey the available settings to the user in such a way that the user does not necessarily have to visually process text to be able to distinguish between those settings. The interface could be or include a verbal interface.

While the invention has been described with reference to improving the visual processing of text by a dyslexic reader, the teachings herein could be used to improve visual processing by other readers such as visually-impaired readers.

To examine the improvement resulting from adjusted text according to the teachings herein, tests were performed on a tablet computer using a sample passage before and after six changes were made. First, the font size was enlarged from 16 point to 24 point. Second, the line height was increased from 1.5 to 3. Third, word spacing was increased from standard spacing to 5 spaces between words. Fourth, the kern was adjusted to 12 points. Fifth, all multisyllabic words were conventionally hyphenated. Sixth, the letters b, d, p, q, h. y, f, t, w, m, n and u (e.g., letters relying on a developed sense of direction, namely left and right and/or up and down) were adjusted to upper case. The following variables representing decoding errors were measured: omissions, insertions, substitutions, aided words repetitions, reversals and total errors.

The variable omissions measures the number of words omitted when a reader reads text. The variable reversals measures the number of errors whereby a reader reads a word or portion of a word out of order. The variable substitutions measures the number of words read by a user that are substituted for other words within the text. The variable insertions measures the number of words added (e.g., due to guesses or predicted words) when a reader reads text. The variable aided words repetitions measures the number of times a word is first read incorrectly and is then corrected. Finally, the variable total errors accumulates all reading errors from the other variables.

For dyslexic readers at a third grade level, there were significant reductions in the number of errors as reflected by the variables omissions, reversals and total errors. For dyslexic readers at a fourth grade level, there were significant reductions in the number of errors as reflected by the variables omissions, insertions, substitutions and total errors. For dyslexic readers at a fifth grade level, there were significant reductions in the number of errors as reflected by the variable omissions but a significant increase in the number of errors as reflected by the variable substitutions. For these readers, there was no significant reduction in the variable total errors. It is theorized that coping strategies developed by the fifth grade made reading the adjusted text more difficult and that other adjustment settings may be more successful.

As used herein, information, signals, or data are received by transmission or accessing the information, signals, or data in any form, such as receiving by transmission over a network, receiving by accessing from a storage device, or receiving by user operation of an input device.

The foregoing description describes only some exemplary implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of the computer devices (e.g., clients and servers) described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. Further, portions of each of the clients and each of the servers described herein do not necessarily have to be implemented in the same manner.

Operations that are described as being performed by a single processor, computer, or device can be distributed across a number of different processors, computers or devices. Similarly, operations that are described as being performed by different processors, computers, or devices can, in some cases, be performed by a single processor, computer or device.

Although features may be described above or claimed as acting in certain combinations, one or more features of a combination can in some cases be excised from the combination, and the combination may be directed to a sub-combination or variation of a sub-combination.

The systems described herein, such as client computers and server computers, can be implemented using general purpose computers/processors modified with a computer program that, when executed, carries out any of the respective methods, algorithms and/or instructions described herein. In addition or alternatively, for example, special purpose computers/processors can be utilized which can contain specialized hardware for carrying out any of the methods, algorithms, or instructions described herein.

Some portions of above description include disclosure presented in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. It should be noted that the process steps and instructions of implementations of this disclosure could be embodied in software, firmware or hardware, and when embodied in software, could be downloaded to reside on and be operated from different platforms used by real time network operating systems.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

At least one implementation of this disclosure relates to an apparatus for performing the operations herein. This apparatus may be specially constructed for the required purposes, or it may comprise a general-purpose computer selectively activated or reconfigured by a computer program stored on a computer readable storage medium that can be accessed by the computer.

All or a portion of the embodiments of the disclosure can take the form of a computer program product accessible from, for example, a non-transitory computer-usable or computer-readable medium. The computer program, when executed, can carry out any of the respective techniques, algorithms and/or instructions described herein. A non-transitory computer-usable or computer-readable medium can be any device that can, for example, tangibly contain, store, communicate, or transport the program for use by or in connection with any processor. The non-transitory medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for tangibly containing, storing, communicating, or transporting electronic instructions.

It is to be understood that the disclosure is not to be limited to the disclosed embodiments but, on the contrary, is intended to cover various modifications and equivalent arrangements included within the scope of the appended claims.

What is claimed is:

1. A method, comprising:
conveying, at a computing device, a plurality of text adjustment settings such that each of the plurality of text adjustment settings is distinguished from others of the plurality of text adjustment settings on a basis other than characters presented on a display screen of the computing device, and at least one of the plurality of text adjustment settings comprising a change to a convention for presenting text in a defined language, wherein the change to the convention for presenting text in the defined language comprises a step of changing some of the text from lower case to upper case based on at least one cognitive impairment rule, where the text changed from lower case to upper case is a certain letter within a word irrelevant of a position of the certain letter within the word;

receiving, at the computing device, a selection from a user of at least one text adjustment setting of the plurality of text adjustment settings;

presenting, on the display screen of the computing device, text in the defined language that is modified using the at least one text adjustment setting; and storing, in a non-transitory storage medium, the selection of the at least one text adjustment setting as a default setting.

2. The method of claim 1, further comprising:

conveying, after presenting the text in the defined language that is modified using the at least one text adjustment setting, a query to the user regarding whether to further modify the text using at least one additional text adjustment setting of the plurality of text adjustment settings, wherein the query includes an instruction for the user to provide a response to the query, the instruction relying on other than characters presented on the display screen to distinguish between possible responses to the query; and wherein storing the selection comprises storing the selection when the response indicates that the text is not further modified.

3. The method of claim 1, further comprising:

receiving, at the computing device, a request for display of written material in the defined language;

modifying the written material using the at least one text adjustment setting of the default setting; and presenting, on the display screen of the computing device, the written material in the defined language that is modified using the at least one text adjustment setting of the default setting.

4. The method of claim 3, further comprising:

conveying, after presenting the written material, a query to the user regarding whether to further modify the written material using at least one additional text adjustment setting of the plurality of text adjustment settings, wherein the query includes an instruction for the user to provide a response to the query, the instruction relying on other than characters presented on the display screen to distinguish between possible responses to the query; and updating the default setting using the at least one additional text adjustment setting when the response indicates that the written material is further modified.

5. The method of claim 1, wherein the default setting comprises at least a first text adjustment setting and a second text adjustment setting of the plurality of adjustment settings, the method further comprising:

removing, per an instruction from the user, the second text adjustment setting from the default setting; and storing the default setting as updated by removing the second text adjustment setting.

6. The method of claim 1, wherein conveying the plurality of text adjustment settings comprises:

simultaneously conveying the plurality of text adjustment settings by presenting each text adjustment setting as a respective user interface element on the display screen, each user interface element including sample text adjusted by the respective text adjustment setting.

7. The method of claim 6, wherein conveying the plurality of text adjustment settings comprises:

conveying, from the computing device, an audible message to the user including instructions regarding how to make the selection of the at least one text adjustment setting of the plurality of text adjustment settings.

8. The method of claim 6, wherein the method includes a step of applying a first text adjustment setting and a step of applying a second text adjustment setting that is different than the first text adjustment setting to modify the text displayed on the screen, and wherein the second text adjustment setting is hyphenation of a word, adjusting a kern, darkening a word or symbol, or enlarging a word or symbol.

9. The method of claim 1, wherein conveying the plurality of text adjustment settings comprises:

sequentially conveying the plurality of text adjustment settings on the display screen of the computing device; and wherein presenting the text modified using the at least one text adjustment setting comprises:

presenting the text modified using a first text adjustment setting after the first text adjustment setting is conveyed and before a second text adjustment setting is conveyed.

10. The method of claim 1, wherein conveying the plurality of text adjustment settings comprises:

using color to distinguish each of the plurality of text adjustment settings from others of the plurality of text adjustment settings.

11. The method of claim 1, wherein conveying the plurality of text adjustment settings comprises:

using a verbal prompt, from a speaker of the computing device, to distinguish each of the plurality of text adjustment settings from others of the plurality of text adjustment settings.

12. The method of claim 1, wherein the certain letter within a word is some or all of the letters b, d, p, q, h, y, t, f, n, u, m, w, and g.

13. A method, comprising:

receiving, at a computing device, a request for display of written material in a defined language;

retrieving, by the computing device, at least one text adjustment setting responsive to the request, the at least one text adjustment setting stored as a default setting within a non-transitory storage medium, the at least one text adjustment setting belonging to a plurality of available text adjustment settings, and at least one of the plurality of available text adjustment settings comprising a change to a convention for presenting text in a defined language, wherein the change to the convention for presenting text in the defined language comprises a change to at least a portion of the text based on pronunciation;

modifying the written material using the at least one text adjustment setting of the default setting, wherein the at least one text adjustment setting is changing a certain letter from lower case to upper case within a word irrelevant of a position of the certain letter within the word;

presenting, on a display screen of the computing device, the written material in the defined language that is modified using the at least one text adjustment setting of the default setting;

conveying, after presenting the written material, a query to a user regarding whether to further modify the written material based on an available text adjustment setting of the plurality of available text adjustment settings, wherein the query includes an instruction for the user to provide a response to the query, the instruction relying on other than characters presented on the display screen to distinguish between possible responses to the query; and further modifying the written material when the response to the query indicates to further modify the written material.

14. The method of claim 13, wherein the change to the convention of the text changed based on the pronunciation is changed by adjusting a kern or hyphenating a word within the text.

15. The method of claim 13, wherein the certain letter within a word is some or all of the letters b, d, p, q, h, y, t, f, n, u, m, w, and g.

16. An apparatus, comprising:
a memory that stores text that is retrieved or inputted by a user; and
at least one processor configured to execute instructions stored in the memory to:
convey a plurality of text adjustment settings such that each of the plurality of text adjustment settings is distinguished from others of the plurality of text adjustment settings on a basis other than characters presented on a display screen, at least one of the plurality of text adjustment settings comprising a change to a convention for presenting the text in a defined language, wherein the change to the convention for presenting the text in the defined language comprises a change to at least a portion of the text based on at least one cognitive impairment rule, wherein the at least one of the plurality of text adjustment settings includes color coding vowels with similar pronunciations;
receive a selection from a user of at least one text adjustment setting of the plurality of text adjustment settings;
display the text in the defined language that is modified using the at least one text adjustment setting on the display screen; and
store the selection of the at least one text adjustment setting as a default setting in a storage device.

17. The apparatus of claim 16, wherein the processor is configured to convey the plurality of text adjustment settings with an audible message to the user describing how to select from the plurality of text adjustment settings so that each of the plurality of text adjustment settings is distinguished from others of the plurality of text adjustment settings.

18. The apparatus of claim 16, wherein the processor is configured to convey the plurality of text adjustment settings by separately presenting each of the plurality of text adjustment settings to the user so that each of the plurality of text adjustment settings is distinguished from others of the plurality of text adjustment settings.

19. The apparatus of claim 16, wherein the processor is configured to convey a query to the user regarding whether to further modify the text by:
projecting an audible query to the user from a speaker; and
displaying at least one user interface element on the display screen for a response to the query.

20. The apparatus of claim 19, wherein the processor is configured to display the at least one user interface element by:
displaying a first user interface element for a positive response to the query; and
displaying a second user interface element for a negative response to the query, wherein the first user interface element and the second user interface element are different in at least one of shape or color.

21. The apparatus of claim 16, wherein the vowels with word or word portions that are color coded include at least two of a, ay, ey, ai, eight, ake, ate, ame, or ane.

* * * * *